United States Patent
Raether (10) Patent No.: US 10,556,198 B2
(45) Date of Patent: *Feb. 11, 2020

(54) FILTER SYSTEMS WITH DIRTY AIR CHAMBER SPACER ELEMENTS AND METHODS OF USING THE SAME

(71) Applicant: Donaldson Company, Inc., Minneapolis, MN (US)

(72) Inventor: Thomas D. Raether, St. Louis Park, MN (US)

(73) Assignee: Donaldson Company, Inc., Minneapolis, MN (US)

(*) Notice: Subject to any disclaimer, the term of this patent is extended or adjusted under 35 U.S.C. 154(b) by 113 days.

This patent is subject to a terminal disclaimer.

(21) Appl. No.: 15/724,441

(22) Filed: Oct. 4, 2017

(65) Prior Publication Data

US 2018/0021712 A1 Jan. 25, 2018

Related U.S. Application Data

(63) Continuation of application No. 14/753,592, filed on Jun. 29, 2015, now Pat. No. 9,795,908, which is a
(Continued)

(51) Int. Cl.
*B01D 46/00* (2006.01)
*B01D 46/24* (2006.01)
*B01D 46/42* (2006.01)

(52) U.S. Cl.
CPC ....... *B01D 46/002* (2013.01); *B01D 46/0005* (2013.01); *B01D 46/0021* (2013.01);
(Continued)

(58) Field of Classification Search
CPC .............. B01D 46/002; B01D 46/0043; B01D 46/0049; B01D 46/0068; B01D 46/0021; B01D 46/0005; B01D 46/2411; B01D 46/0067; B01D 46/4281; B01D 46/0071; B01D 46/0069
See application file for complete search history.

(56) References Cited

U.S. PATENT DOCUMENTS 3,942,962 A 3/1976 Duyckinck
3,963,467 A 6/1976 Rolschau
(Continued)

FOREIGN PATENT DOCUMENTS

AU 686 191 B2 2/1998
DE 93 11 201 U1 10/1993
(Continued)

OTHER PUBLICATIONS

U.S. Appl. No. 61/648,492, filed May 17, 2012, Raether.
(Continued)

*Primary Examiner* — Robert Clemente
(74) *Attorney, Agent, or Firm* — Mueting, Raasch & Gebhardt, P.A.

(57) ABSTRACT

Filter systems and methods described herein include one or more spacer elements positioned in the dirty air chamber along with the filter elements attached to the spacer elements. The dirty air inlet delivers a dirty air stream into the dirty air chamber along a dirty air flow axis.

37 Claims, 8 Drawing Sheets

Related U.S. Application Data continuation of application No. 13/896,564, filed on May 17, 2013, now Pat. No. 9,067,164.

(60) Provisional application No. 61/790,184, filed on Mar. 15, 2013, provisional application No. 61/648,494, filed on May 17, 2012.

(52) U.S. Cl.
CPC ..... *B01D 46/0043* (2013.01); *B01D 46/0068* (2013.01); *B01D 46/2411* (2013.01); *B01D 46/4281* (2013.01)

(56) References Cited

U.S. PATENT DOCUMENTS

| | | |
|---|---|---|
| 4,073,632 A | 2/1978 | Reinauer et al. |
| 4,159,197 A | 6/1979 | Schuler et al. |
| 4,218,227 A | 8/1980 | Frey |
| 4,276,069 A | 6/1981 | Miller |
| 4,395,269 A | 7/1983 | Schuler |
| 4,424,070 A | 1/1984 | Robinson |
| 4,436,536 A | 3/1984 | Robinson |
| 4,443,237 A | 4/1984 | Ulvestad |
| 4,445,915 A | 5/1984 | Robinson |
| 4,504,293 A | 3/1985 | Gillingham et al. |
| 4,652,285 A | 3/1987 | Greene |
| 4,661,131 A | 4/1987 | Howeth |
| 4,880,530 A | 11/1989 | Frey |
| 4,954,255 A | 9/1990 | Muller et al. |
| 5,207,812 A | 5/1993 | Tronto et al. |
| 5,211,846 A | 5/1993 | Kott et al. |
| 5,222,488 A | 6/1993 | Forsgren |
| 5,562,746 A | 10/1996 | Raether |
| 5,730,766 A | 3/1998 | Clements |
| 5,803,939 A | 9/1998 | Huning |
| 6,090,173 A | 7/2000 | Johnson et al. |
| 6,902,592 B2 | 6/2005 | Green et al. |
| 7,641,708 B2 | 1/2010 | Kosmider et al. |
| 8,075,648 B2 | 12/2011 | Raether |
| 9,067,164 B2 * | 6/2015 | Raether .............. B01D 46/4281 |
| 9,795,908 B2 * | 10/2017 | Raether .............. B01D 46/4281 |
| 2004/0079231 A1 | 4/2004 | Green et al. |
| 2009/0217630 A1 | 9/2009 | Bitner |
| 2012/0324845 A1 | 12/2012 | Doehia et al. |

FOREIGN PATENT DOCUMENTS

| | | |
|---|---|---|
| DE | 20 2006 005677 | 7/2006 |
| DE | 20 2006 005 677 U1 | 8/2006 |
| JP | 2006 095004 | 4/2006 |

OTHER PUBLICATIONS

U.S. Appl. No. 61/648,494, filed May 17, 2012, Raether.
U.S. Appl. No. 61/772,198, filed Mar. 4, 2013, Raether.
U.S. Appl. No. 61/789,385, filed Mar. 15, 2013, Raether.
U.S. Appl. No. 61/790,184, filed Mar. 15, 2013, Raether.
U.S. Appl. No. 13/896,585, filed May 17, 2013, Raether.
"Donaldson® Torit® Downflo® Oval Dust Collectors," Nov. 2011; Donaldson Company, Inc.; 16 pgs.
International Search Report and Written Opinion for PCT/US2013/041540 dated Jul. 4, 2013; 11 pgs.
International Preliminary Report on Patentability for PCT/US2013/041540 dated Nov. 27, 2014. 8 pgs.

* cited by examiner

FILTER SYSTEMS WITH DIRTY AIR CHAMBER SPACER ELEMENTS AND METHODS OF USING THE SAME

CROSS-REFERENCE TO RELATED APPLICATIONS

The present application is a continuation of U.S. patent application Ser. No. 14/753,592, filed on Jun. 29, 2015, which is a continuation application of U.S. patent application Ser. No. 13/896,564, filed on May 17, 2013, which claims priority to U.S. Provisional Application Ser. No. 61/648,494, filed on May 17, 2012, and U.S. Provisional Application Ser. No. 61/790,184, filed on Mar. 15, 2013, all of which are incorporated herein by reference in their entirety.

Filter systems having spacer elements positioned in the dirty air chamber between the tubesheet and filter elements and methods of using the filter systems are described herein.

BACKGROUND

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Systems for cleaning an air or other gas stream laden with particulate matter include filter systems that have filter elements disposed in a housing. The filter element may be a bag, sock or cartridge including a suitable filter media, e.g., fabric, pleated paper, etc. The gas stream contaminated with particulate matter is typically passed through the housing so that the particulate matter is captured and retained by one or more filter elements.

In a standard design, a filter system has a clean air chamber and a dirty air chamber. The two chambers are separated by a structure that is commonly referred to as a tubesheet. The tubesheet has a number of openings so that air can pass between the clean and dirty air chambers. The filter elements are positioned over the openings so that particulate-laden air (dirty air) introduced into the dirty air chamber must pass through a filter element to move into the clean air chamber. The particulate matter in the dirty air collects on the filter elements as the air moves through the filter elements. From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter elements capture particulate matter, flow through the system is inhibited and periodic cleaning of the filter elements can be performed to increase air flow through the system. Cleaning can be accomplished by periodically pulsing a jet of pressurized air (or another gas or gasses) into the interior of the filter element to reverse the air flow through the filter element, causing the collected particulate matter to be driven off of the filter element. The pressurized air may be directed into venturi elements as described in, e.g., U.S. Pat. No. 3,942,962 (Duyckinck), U.S. Pat. No. 4,218,227 (Frey), U.S. Pat. No. 6,090,173 (Johnson et al.), U.S. Pat. No. 6,902,592 (Green et al.), and U.S. Pat. No. 7,641,708 (Kosmider et al.).

SUMMARY

The filter systems described herein include a plurality of spacer elements positioned in the dirty air chamber along with the filter elements attached to the spacer elements. In one or more embodiments, the spacer elements may be in the form venturi elements that have a constricted throat between an inlet and an outlet.

In contrast to the arrangement of the spacer elements in the filter assemblies described herein, venturi elements in conventional filter systems have typically been located in the clean air chamber and/or within the filter elements themselves. Operating such filter systems at an increased dirty air flow volume results in increased air speeds within the dirty air chamber, which can potentially reduce the filter life because of the abrasiveness of the particulate matter in the air within the dirty air chamber. For example, increased airflow through the filter system causes increases in air/particulate velocity which can potentially abrade holes in the filter elements.

By placing the spacer elements in the dirty air chamber, the volume of the dirty air chamber can, in some embodiments, be increased relative to conventional dirty air chambers in which the venturi elements are provided in the clean air chamber and/or within at least a portion of the filter elements. The increased volume of the dirty air chamber can reduce the air velocities in the region of the dirty air chamber occupied by the filter elements. The reduced air velocity in the dirty air chamber can, in some embodiments, reduce abrasion of the media on the filter elements.

In one or more embodiments of the filter systems described herein, the dirty air inlets may be configured to deliver dirty air streams directly onto, past, and/or between the spacer elements in the dirty air chamber which can potentially provide additional advantages. In some instances, some of the particulate matter in the dirty air stream will be deposited directly in the collection hopper without ever reaching the filter elements. That can effectively reduce particulate loading on the filter elements and improve the life of the filter elements. Further, in some applications, it may be valuable to avoid direct, high velocity contact between the particulate matter entrained in the dirty air stream and the filter media of the filter elements.

Still another potential advantage of one or more embodiments of the filter systems described herein is that the combination of the reduced air velocity in the larger dirty air chamber and, potentially, the early removal of particulate matter (caused by directing the dirty air stream onto or past the exposed spacer elements in the dirty air chamber in one or more embodiments) can reduce the amount of particulate matter that remains suspended in the dirty air chamber, thus lowering particulate loading on the filter elements and extending filter life.

In a first aspect, one or more embodiments of the filter systems described herein include: a housing comprising a tubesheet separating the housing into a dirty air chamber and a clean air chamber; a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber; a plurality of apertures in the tubesheet, wherein each spacer element of the plurality of spacer elements is positioned over an aperture of the plurality of apertures in the tubesheet such that air passing from the dirty air chamber into the clean air chamber through each spacer element of the plurality of spacer elements passes through the aperture; a plurality of filter elements, wherein each filter element of the plurality of filter elements is attached to the clean air inlet of one spacer element of the plurality of spacer elements; and a dirty air inlet attached to the housing, wherein the dirty air inlet is configured to deliver a dirty air stream into the dirty air chamber.

In one or more embodiments of the filter systems described herein, the housing comprises an end wall panel located across the dirty air chamber from the tubesheet, and wherein each spacer element of the plurality of spacer elements and the filter element attached to each spacer element extend across the dirty air chamber from the tubesheet to the end wall panel.

In one or more embodiments of the filter systems described herein, the dirty air inlet is configured to deliver the dirty air stream into the dirty air chamber along a dirty air flow axis, and wherein the dirty air flow axis extends through or passes at least one spacer element of the plurality of spacer elements at a location between the clean air inlet and the clean air outlet of the at least one spacer element such that dirty air entering the dirty air chamber along the dirty air flow axis contacts or passes at least one spacer element of the plurality of spacer elements at a location between the clean air inlet and the clean air outlet of the at least one spacer element before contacting the plurality of filter elements.

In one or more embodiments of the filter systems described herein, the dirty air inlet is configured to deliver the dirty air stream into the dirty air chamber along a dirty air flow axis, and wherein the dirty air flow axis does not extend through any filter elements of the plurality of filter elements. In one or more embodiments, the dirty air flow axis extends through or passes at least one spacer element of the plurality of spacer elements at a location between the clean air inlet and the clean air outlet of the at least one spacer element such that dirty air entering the dirty air chamber along the dirty air flow axis contacts or passes at least one spacer element of the plurality of spacer elements at a location between the clean air inlet and the clean air outlet of the at least one spacer element before contacting the plurality of filter elements.

In one or more embodiments of the filter systems described herein, each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

In one or more embodiments of the filter systems described herein, each spacer element of the plurality of spacer elements comprises an element length measured along an element axis extending though the clean air inlet and the clean air outlet of the spacer element, and wherein the dirty air inlet defines a width measured parallel to the element axis that is less than or equal to an average element length of the plurality of element lengths of the plurality of spacer elements.

In one or more embodiments of the filter systems described herein, the dirty air inlet is configured to deliver the dirty air stream into the dirty air chamber along a dirty air flow axis, and wherein the dirty air inlet comprises a perimeter where the dirty air inlet enters the dirty air chamber, and further wherein a projection of the perimeter parallel to the dirty air flow axis through the dirty air chamber does not intersect any filter elements of the plurality of filter elements.

In one or more embodiments of the filter systems described herein, the housing comprises an end wall panel located across the dirty air chamber from the tubesheet, and wherein each spacer element of the plurality of spacer elements and the filter element attached to each spacer element extend across the dirty air chamber from the tubesheet to the end wall panel, and further wherein the dirty air inlet extends across the dirty air chamber from the tubesheet to the end wall panel.

In one or more embodiments of the filter systems described herein, the tubesheet comprises a dirty air side facing the dirty air chamber and a clean air side facing the clean air chamber, and wherein the clean air outlet of each spacer element of the plurality of spacer elements is positioned on the dirty air side of the tubesheet.

In one or more embodiments of the filter systems described herein, each spacer element of the plurality of spacer elements does not extend into the into the clean air chamber.

In one or more embodiments of the filter systems described herein, the plurality of spacer elements comprises a plurality of venturi elements, wherein each venturi element of the plurality of venturi elements comprises a throat located between a clean air inlet and a clean air outlet, and wherein the clean air inlet of each venturi element of the plurality of venturi elements is located in the dirty air chamber. In one or more embodiments, the throat of each venturi element of the plurality of venturi elements is positioned on the dirty air side of the tubesheet and is exposed within the dirty air chamber.

In one or more embodiments of the filter systems described herein, the system further comprises a pulse-jet cleaning system comprising a blowpipe oriented to direct a pulse of air into the clean air outlet and toward the clean air inlet of each spacer element of the plurality of spacer elements.

In a second aspect, one or more embodiments of filter systems as described herein may include: a housing comprising a tubesheet separating the housing into a dirty air chamber and a clean air chamber; a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber; a plurality of apertures in the tubesheet, wherein each spacer element of the plurality of spacer elements is positioned over an aperture of the plurality of apertures in the tubesheet such that air passing from the dirty air chamber into the clean air chamber through each spacer element of the plurality of spacer elements passes through the aperture; a plurality of filter elements, wherein each filter element of the plurality of filter elements is attached to the clean air inlet of one spacer element of the plurality of spacer elements; and a dirty air inlet attached to the housing, wherein the dirty air inlet is configured to deliver a dirty air stream into the dirty air chamber along a dirty air flow axis, and wherein the dirty air flow axis extends through or passes at least one spacer element of the plurality of spacer elements at a location between the clean air inlet and the clean air outlet of the at least one spacer element such that dirty air entering the dirty air chamber along the dirty air flow axis contacts or passes at least one spacer element of the plurality of spacer elements at a location between the clean air inlet and the clean air outlet of the at least one spacer element before contacting the plurality of filter elements.

In one or more embodiments of the filter systems described herein, the housing comprises an end wall panel located across the dirty air chamber from the tubesheet, and wherein each spacer element of the plurality of spacer elements and the filter element attached to each spacer element extend across the dirty air chamber from the tubesheet to the end wall panel.

In one or more embodiments of the filter systems described herein, the dirty air flow axis does not extend through any filter elements of the plurality of filter elements.

In one or more embodiments of the filter systems described herein, each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

In one or more embodiments of the filter systems described herein, each spacer element of the plurality of spacer elements comprises an element length measured along an element axis extending though the clean air inlet and the clean air outlet of the spacer element, and wherein the dirty air inlet defines a width measured parallel to the element axis that is less than or equal to an average element length of the plurality of element lengths of the plurality of spacer elements.

In one or more embodiments of the filter systems described herein, the dirty air inlet comprises a perimeter where the dirty air inlet enters the dirty air chamber, and further wherein a projection of the perimeter parallel to the dirty air flow axis through the dirty air chamber does not intersect any filter elements of the plurality of filter elements.

In one or more embodiments of the filter systems described herein, the tubesheet comprises a dirty air side facing the dirty air chamber and a clean air side facing the clean air chamber, and wherein the clean air outlet of each spacer element of the plurality of spacer elements is positioned on the dirty air side of the tubesheet.

In one or more embodiments of the filter systems described herein, each spacer element of the plurality of spacer elements does not extend into the into the clean air chamber.

In one or more embodiments of the filter systems described herein, the plurality of spacer elements comprises a plurality of venturi elements, wherein each venturi element of the plurality of venturi elements comprises a throat located between a clean air inlet and a clean air outlet, and wherein the clean air inlet of each venturi element of the plurality of venturi elements is located in the dirty air chamber. In one or more embodiments, the throat of each venturi element of the plurality of venturi elements is positioned on the dirty air side of the tubesheet and is exposed within the dirty air chamber.

In one or more embodiments of the filter systems described herein, the system further comprises a pulse-jet cleaning system comprising a blowpipe oriented to direct a pulse of air into the clean air outlet and toward the clean air inlet of each spacer element of the plurality of spacer elements.

In a third aspect, one or more embodiments of methods of removing particulate matter from dirty air may include: delivering dirty air into a dirty air chamber of a housing comprising a tubesheet separating the housing into the dirty air chamber and a clean air chamber, wherein the dirty air is delivered into the dirty air chamber in a dirty air stream along a dirty air flow axis; and positioning a plurality of spacer elements and attached filter elements in the dirty air chamber, wherein each spacer element of the plurality of spacer comprises a clean air inlet and a clean air outlet, and wherein the clean air inlet of each spacer element of the plurality of spacer elements is located in the dirty air chamber, and further wherein each spacer element of the plurality of spacer elements and the filter element attached to each spacer element extend across the dirty air chamber from a tubesheet to an end wall panel located across the dirty air chamber from the tubesheet.

In one or more embodiments of the methods described herein, dirty air traveling into the dirty air chamber through the dirty air inlet along the dirty air flow axis contacts at least one spacer element of the plurality of spacer elements or passes one or more spacer elements of the plurality of spacer elements at a location between the clean air inlet and the clean air outlet of each of the spacer elements before contacting the plurality of filter elements.

In one or more embodiments of the methods described herein, the dirty air flow axis does not extend through any filter elements of the plurality of filter elements.

In one or more embodiments of the methods described herein, each spacer element of the plurality of spacer elements comprises an element length measured along an element axis extending though the clean air inlet and the clean air outlet of the spacer element, and wherein the dirty air inlet defines a width measured parallel to the element axis that is less than or equal to an average element length of the plurality of element lengths of the plurality of spacer elements.

In one or more embodiments of the methods described herein, the dirty air inlet comprises a perimeter where the dirty air inlet enters the dirty air chamber, and wherein a projection of the perimeter parallel to the dirty air flow axis through the dirty air chamber does not intersect any filter elements of the plurality of filter elements.

In a fourth aspect, one or more embodiments of methods of removing particulate matter from a dirty air stream may involve using any of the filter systems described herein to remove that particulate matter.

The above summary is not intended to describe each embodiment or every implementation of the filter systems and methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Figure 1:
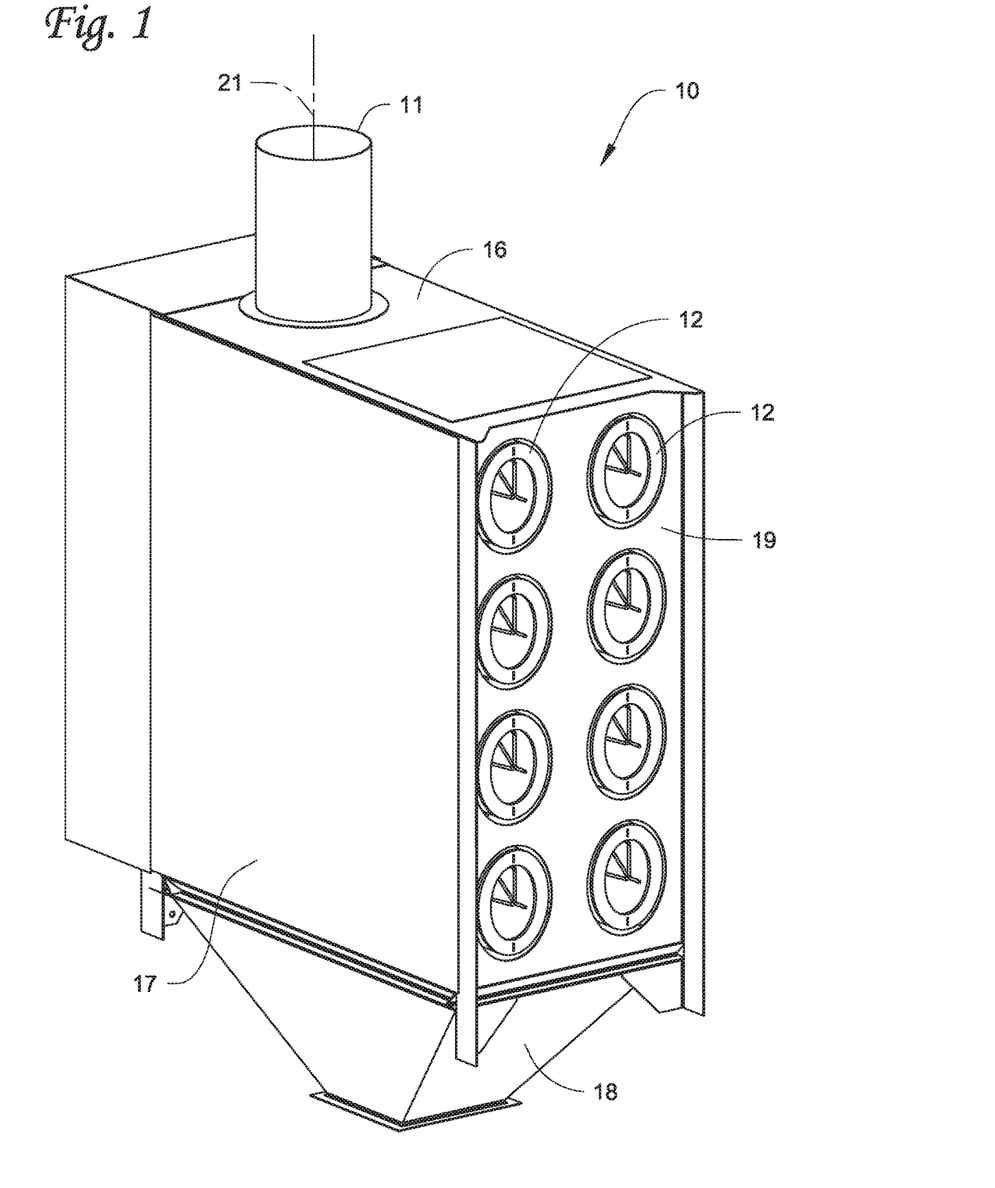
FIG. 1 is a perspective view of one illustrative embodiment of a filter system as described herein.

Referring to FIGS. 1-4A, one illustrative embodiment of a filter system is depicted generally at 10. The filter system depicted in FIG. 1 has a housing that may, in one or more embodiments, be generally in the shape of a box that includes an upper wall panel 16, and two pairs of opposite side wall panels 17 (one of which is depicted in FIG. 1), and end wall panel 19.

The filter system 10 includes a dirty air inlet 11 for receiving dirty or contaminated air (i.e., air with particulate matter entrained therein) into the filter system 10. A clean air outlet 13 (see, e.g., FIGS. 3 and 4) may be provided for venting clean or filtered air from the filter system 10. The filter system 10 includes access openings 12 in end wall panel 19 for filter elements (not shown in FIG. 1) configured together in a side-by-side arrangement. In use, each of the access openings 12 in end wall panel 19 is sealed by a cover (not shown) such that dirty air entering the filter system 10 does not escape through the access openings 12.

The depicted filter system 10 also includes blowpipes 20 (see, e.g., FIGS. 2 and 3) as part of an optional pulse-jet cleaning system, with the blowpipes 20 configured to direct a pulse of air into the filter elements as described herein. The filter system 10 may also include a hopper 18 to collect particulate matter separated from the dirty air stream as described herein. The hopper 18 may include sloped walls to facilitate collection of the particulate matter and may, in some embodiments, include a driven auger or other mechanism for removing the collected particulate matter.

It should be understood that features of the illustrative embodiments of the filter systems described herein that are not explicitly recited in the claims are optional, e.g., features such as the number of filter elements, access openings, shape and/or size of the housing, etc. may be changed in one or more alternative embodiments of filter systems as described herein. It should also be understood that, other than the filter media in the filter elements, the components of the filter systems described herein will typically be constructed of materials (e.g., metals, polymers, ceramics, etc.) that are impermeable to air.

Figure 2:
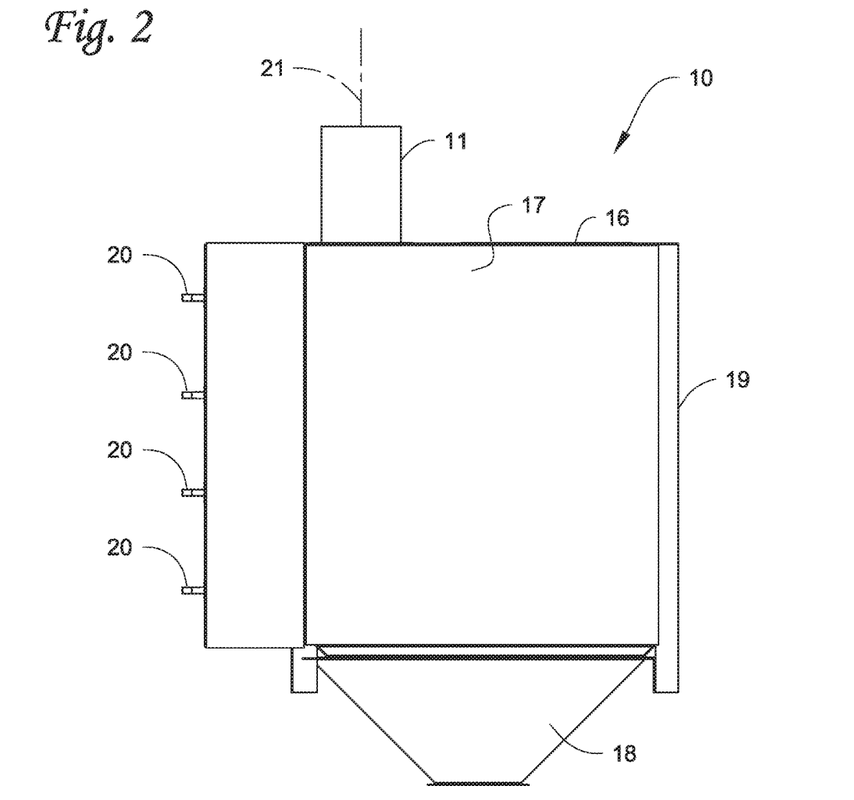
FIG. 2 is a side view of the filter system depicted in FIG. 1.
Figure 3:
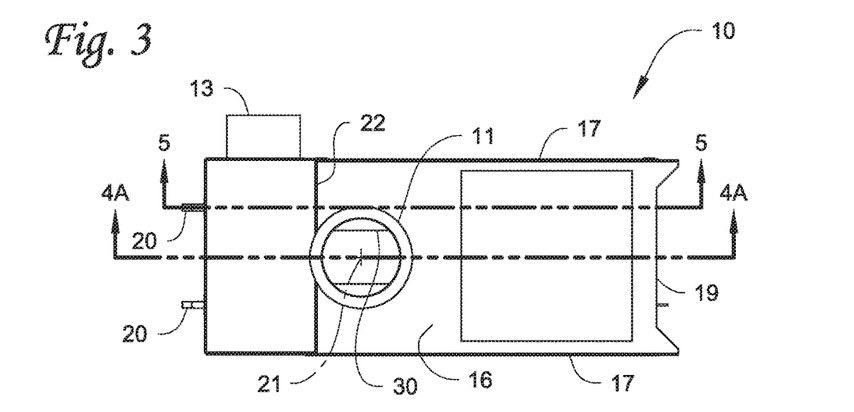
FIG. 3 is a top view of the filter system depicted in FIGS. 1 and 2.
Figure 4A:
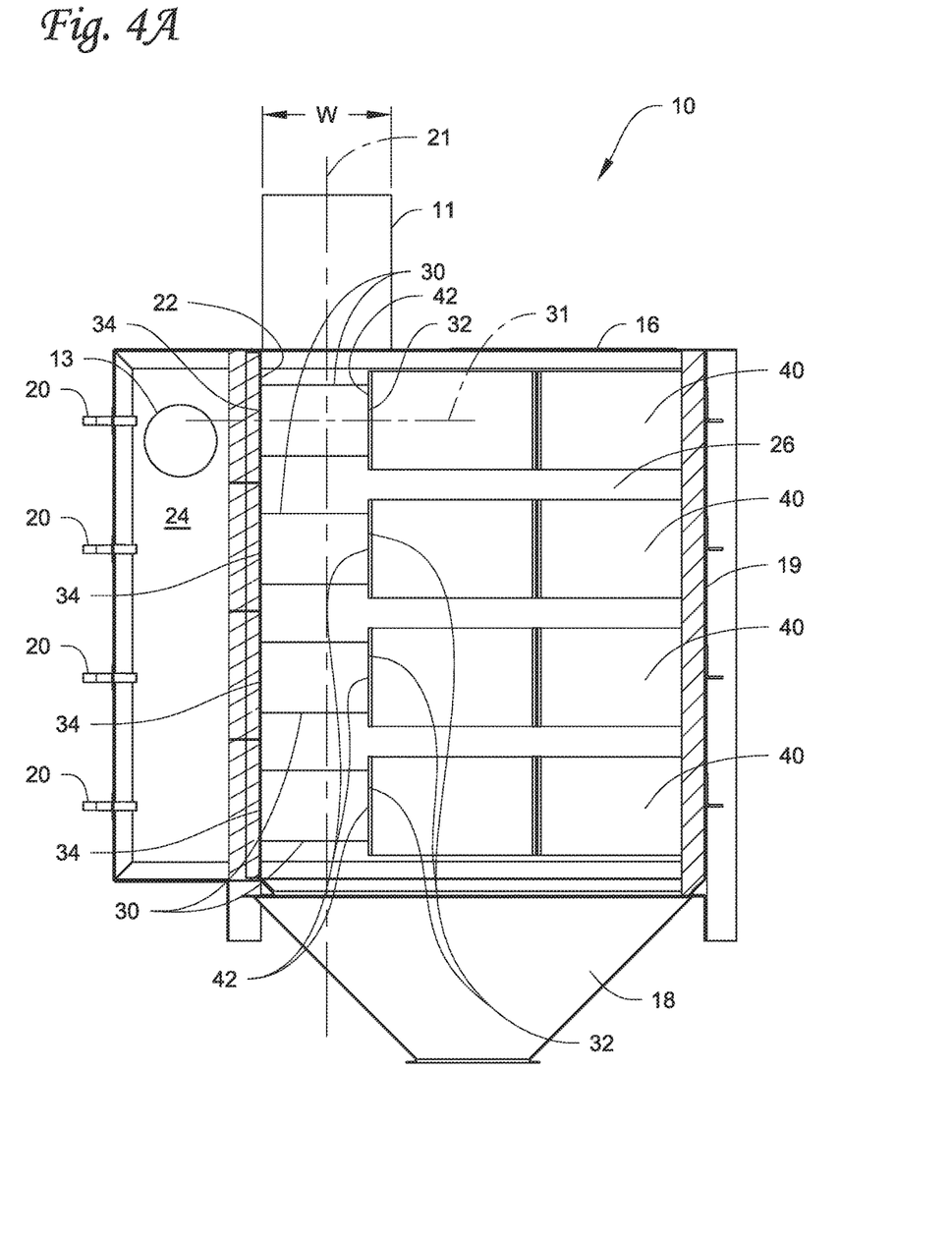
FIG. 4A is a cross-sectional view of the filter system of FIGS. 1-3 taken along line 4A-4A in FIG. 3.

The illustrative embodiment of filter system 10 of FIG. 1 is depicted in a side elevation in FIG. 2, a top plan view in FIG. 3, and a cross-sectional view in FIG. 4A that is taken along line 4A-4A in FIG. 3 to depict the interior of the filter system 10. The interior of the filter system housing includes a tubesheet 22 that separates the interior volume of the housing into a clean air chamber 24 and a dirty air chamber 26. As depicted in FIGS. 3 and 4A, the filter system 10 includes a clean air outlet 13 through which clean air exits from the clean air volume during operation of the filter system 10. The clean air outlet 13 may be positioned to remove clean air from any location in the clean air chamber 24. A dirty air inlet 11 is provided and dirty air enters the dirty air chamber 26 of the housing through the dirty air inlet 11.

The depicted filter system 10 includes spacer elements 30 and filter elements 40 in the dirty air volume 26. Each of the spacer elements 30 includes a clean air inlet 32 and a clean air outlet 32, and is attached to the tubesheet 22 over an aperture (see, e.g., apertures 28 in FIG. 5). Clean air passing through the spacer element 30 from a filter element 40 attached to the clean air inlet 32 of the spacer element enters the clean air chamber 24 through the aperture in the tubesheet 22.

In one or more embodiments of the filter systems described herein, the tubesheet 22 may be described as having a dirty air side facing the dirty air chamber 26 and a clean air side facing the clean air chamber 24. Further, the clean air outlet 34 of each of the spacer elements 30 may be described as being positioned, in one or more embodiments, on the dirty air side of the tubesheet 22. In one or more embodiments of the filter systems described herein, the spacer elements 30 do not extend into the clean air chamber 24.

In one or more embodiments of the filter systems described herein, the combined length of each spacer element 30 and its attached filter element 40 may extend from the tubesheet 22 to the end wall panel 19, across the entire width of the dirty air chamber 26.

In one or more embodiments of the filter systems described herein as depicted in, e.g., FIG. 4A, the clean air inlets 32 of the spacer elements 30 are located in the dirty air chamber 26 and the filtered air outlets 42 of the filter elements 40 are attached to the spacer elements 30 such that air leaving the interior or filtered air volume of the filter elements 40 through filtered air outlets 42 passes through the clean air inlets 32 of the spacer elements 30. In one or more embodiments, the clean air inlets 32 of one or more of the spacer elements 30 may be located within the interior or filtered air volumes of the filter elements 40 such that, e.g., the filtered air outlet 42 of the filter element 40 is located closer to the tubesheet 22 than the clean air inlet 32 of the spacer element 30 to which it is attached. Even in such a case, however, the flow of dirty air along the dirty air flow axis 21 (described below) into the dirty air chamber 26 still contacts or passes the spacer elements 30 before contacting the filter elements 40. In one or more embodiments, the entire spacer element 30, from its clean air inlet 32 to its clean air outlet 34 may be located in the dirty air chamber 26 with its exterior surface exposed to dirty air moving through the dirty air chamber 26.

The dirty air inlet 11 is, in one or more embodiments of the filter systems described herein, configured to deliver a dirty air stream into the dirty air chamber 26 along a dirty air flow axis 21 that is, in one or more embodiments, positioned in the central portion of the dirty air flow entering the dirty air chamber 26 through the dirty air inlet 11 (such that, e.g., the dirty air flow axis could be described as the "central flow axis"). The dirty air flow axis 21 depicted in FIG. 4A may, in one or more embodiments, be coincident with a line extending through the geometric center of the opening through which dirty air enters the dirty air chamber 26 through the dirty air inlet 11. That line and the dirty air flow axis 21 defined by it may be described as aligned with the direction of flow into the dirty air chamber 26 when the filter system 10 is operating at or near its rated volumetric capacity. Where, for example, the dirty air inlet 11 has a circular cross-section, the dirty air flow axis 21 will extend through the center of that circle and be aligned with the direction of flow as described herein.

In one or more embodiments of the filter systems described herein, the dirty air flow axis 21 may be described as extending through or passing at least one spacer element 30 at a location between the clean air inlet 32 and the clean air outlet 34 of the spacer element 30. As a result, dirty air entering the dirty air chamber 26 along the dirty air flow axis 21 may, in one or more embodiments, contact or pass the spacer elements 30 at locations between their clean air inlets 32 and clean air outlets 34 before contacting the filter elements 40 in the dirty air chamber.

Figure 4B:
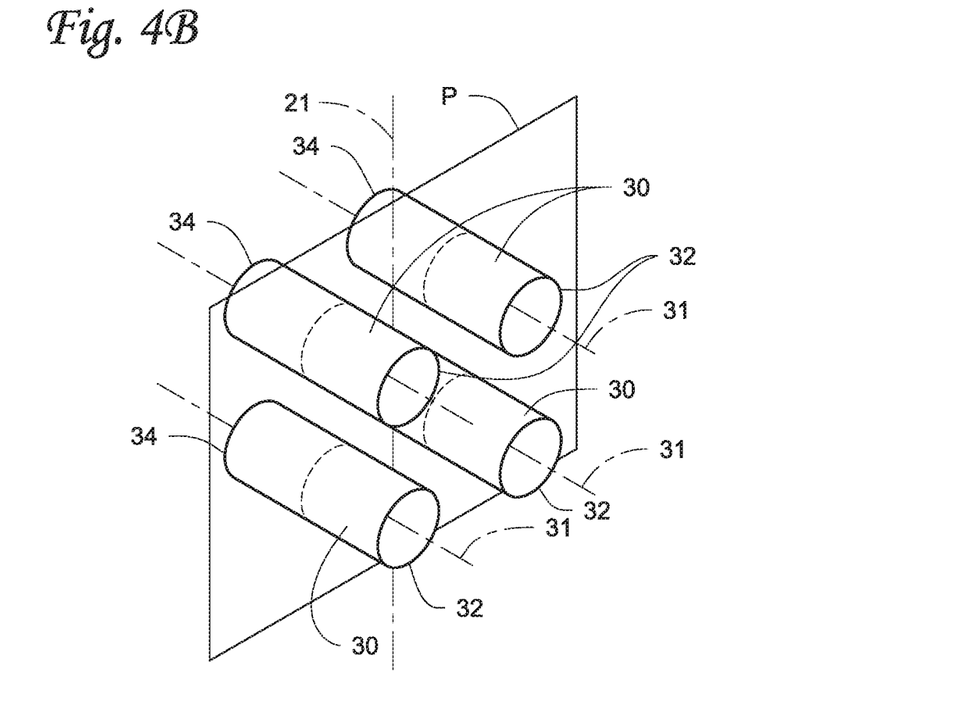
FIG. 4B is a schematic diagram depicting illustrative relationships between a dirty air flow axis and spacer elements.
Figure 4C:
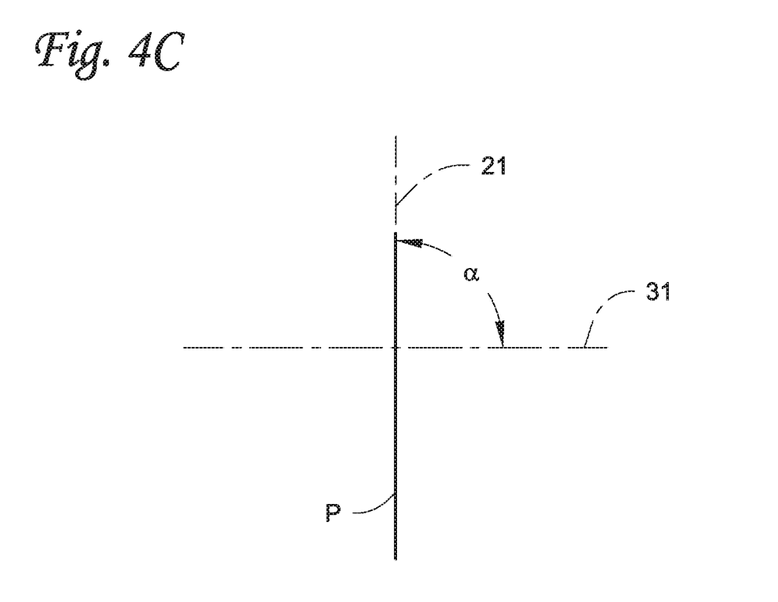
FIG. 4C is a schematic diagram illustrating one illustrative angular relationship between a dirty air flow axis and a spacer element axis as described herein.

A schematic depiction of the arrangement of the dirty air flow axis 21 with respect to a group of the spacer elements 30 is depicted in FIG. 4B. Each of the spacer elements 30 has a clean air inlet 32 and a clean air outlet 34 and defines an element axis 31 that extends through the clean air inlet 32 and the clean air outlet 34. The dirty air flow axis 21 may be described as being located on a plane P while the element axes 31 of the spacer elements 30 intersect, but are not located in the plane P. In one or more embodiments in which the dirty air flow axis 21 intersects an element axis 31, the dirty air flow axis 21 may be perpendicular to the element axis 31 or form another included angle α (alpha) that is less than 90 degrees (see FIG. 4C). Alternatively, where the dirty air flow axis 21 does not intersect an element axis 31, the plane P in which the dirty air flow axis 21 is located and which intersects all of the element axes 31 may be perpendicular to the element axis 31 or form another included angle α (alpha) that is less than 90 degrees (as seen in FIG. 4C where the edge of plane P is coincident with axis 21).

The result of the spatial relationships between the dirty air flow axis 21 and the spacer elements 30 and filter elements 40 in filter systems as described herein is that dirty air entering the dirty air chamber 26 along the dirty air flow axis 21 may, in one or more embodiments, contact or pass the spacer elements 30 at locations between their clean air inlets 32 and clean air outlets 34 before contacting the filter elements 40 in the dirty air chamber.

In other words, the spacer elements 30 and the dirty air inlet 11 are arranged such that the dirty air stream entering the dirty air chamber 26 along the dirty air flow axis 21 contacts or passes the exterior surfaces of the spacer elements 30. In some cases, particulate matter entrained in the dirty air flow may pass by the spacer elements 30 and go directly to the hopper 18 below the dirty air chamber 26. In some cases, particulate matter entrained in the dirty air flow contacts the exterior surface of one or more of the spacer elements 30, where it may be redirected within the dirty air chamber 26 so that it is eventually delivered to the hopper 18 or to the filter elements 40.

The arrangement of the dirty air inlet and the dirty air flow axis defined by it, relative to the spacer elements and filter elements may, in one or more embodiments, be alternatively or additionally characterized as follows.

In one or more embodiments, the dirty air flow axis 21 may be described as not extending through any of the filter elements 40 in the dirty air chamber 26.

In one or more embodiments, the spacer elements 30 may be described as having an element length measured along their element axes 31 extending though their clean air inlets and clean air outlets. The dirty air inlet 11 may be described as defining a width W (see FIG. 4A) measured parallel to the element axes 31 that is less than or equal to an average element length of the element lengths of the spacer elements 30. Although the spacer elements 30 may typically all have the same element length, that is not required for the filter systems described herein.

In one or more alternative embodiments, the width W may be less than or equal to 2 times an average element length of the spacer elements 30 (while in one or more alternative embodiments, the size of the dirty air inlet may be substantially larger—as discussed below in connection with FIG. 4E). Even in such an arrangement, one or more embodiments of the filter systems described herein may still have a dirty air inlet that defines a dirty air flow axis 21 that extends through or passes by the spacer elements 30 at a location between their clean air inlets and outlets and/or that does not extend through any of the filter elements 40 in the dirty air chamber 26.

In one or more embodiments of the filter systems described herein, the dirty air inlet 11 may be described as having a perimeter where the dirty air inlet 11 enters the dirty air chamber 26 (see, e.g., the top view of FIG. 3). A projection of that dirty air inlet 11 perimeter parallel to the dirty air flow axis 21 through the dirty air chamber 26 towards the hopper 18 does not intersect any filter elements 40 in the dirty air chamber 26.

Although not specifically described herein, the spacer elements used in the filter systems described herein may be attached to tubesheets and filter elements by any suitable technique or combination of techniques. The illustrative embodiments of the spacer elements 30 may, in one or more embodiments, include flanges at their clean air outlets 34 and clean air inlets 32 that may facilitate attachment between the spacer elements 30, tubesheet 22, and filter elements 40 in manners that limit leakage through those junctions.

Furthermore, although the illustrative filter elements 30 are depicted as having a constant size (e.g., width, height, diameter, etc.) between the clean air inlet 32 and the clean air outlet 34, the spacer elements used in one of more alternative embodiments of the filter systems described herein may change in size between their inlets and outlets. One example of spacer elements that may change in size between their inlets and outlets are commonly referred to as venturi elements.

Figure 4D:
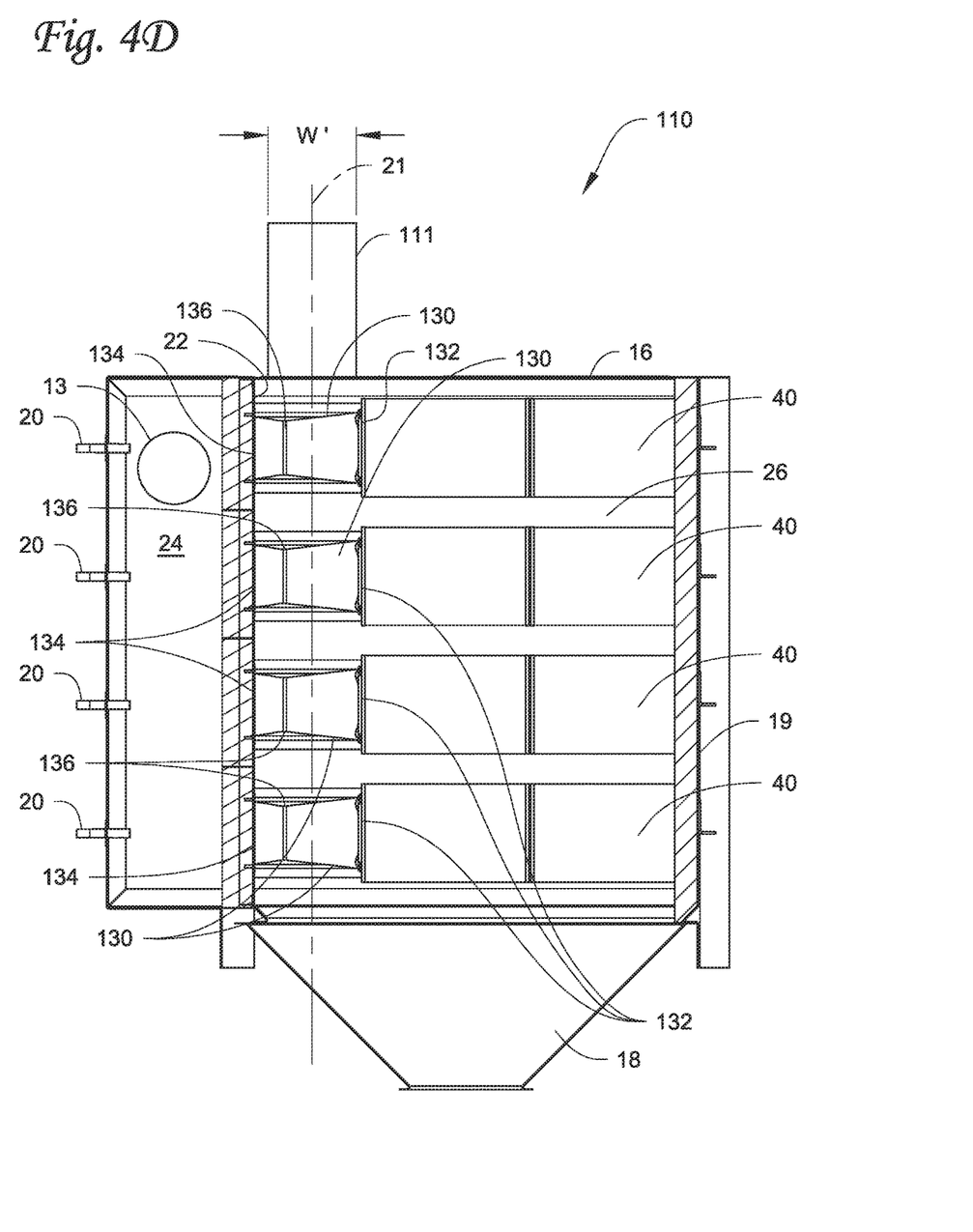
FIG. 4D is a cross-sectional view of an alternative illustrative embodiment of a filter system including venturi elements as described herein.

Referring to the illustrative embodiment of filter system 110 depicted in FIG. 4D, the more generic spacer elements 30 seen in FIG. 4A have been replaced by venturi elements 130 with most other features and components of the filter system 110 remaining largely the same as in filter system 10. The venturi elements 130 include a clean air inlet 132 and a clean air outlet 134 (similar to the clean air inlets 32 and outlets 34 of the spacer elements 30). The venturi elements 130 also, however, also include a throat 136 that constricts flow through the venturi element 130 because the open area within the throat 136 is smaller than the open area of the clean air inlet 132 and/or the clean air outlet 134.

Examples of venturi elements that may potentially be used as spacer elements in the filter systems described herein may be described in, e.g., U.S. Pat. No. 3,942,962 (Duyckinck), U.S. Pat. No. 4,218,227 (Frey), U.S. Pat. No. 6,090,173 (Johnson et al.), U.S. Pat. No. 6,902,592 (Green et al.), and U.S. Pat. No. 7,641,708 (Kosmider et al.). Other potentially suitable venturi elements that may be used as spacer elements may be described in U.S. Provisional Patent Application No. 61/648,492, titled AIR FILTER SYSTEM HAVING VENTURI ELEMENTS WITH EXTENDED PULSE OUTLETS, filed on May 17, 2012.

Because the throats 136 of the venturi elements 130 are located at an intermediate position between the clean air inlets 132 and the clean air outlets 134, filter systems as described herein that use venturi elements 130 as spacer elements may, in one or more embodiments, as having the throats 136 of the venturi elements 130 located in the dirty air chamber 26 where they may further be described as having an exterior surface that is exposed within the dirty air chamber 26.

Another difference in the illustrative embodiment of filter system 110 depicted in FIG. 4D from that depicted in FIG. 4A is the size of the dirty air inlet 111. In the illustrative embodiment depicted in FIG. 4D, the width (W') of the dirty air inlet 111 may be taken in a direction parallel to the element axes extending though their clean air inlets 132 and clean air outlets 134 of the venturi elements 130. The width W' of the dirty air inlet 111 may be described as being less than the average element length of the element lengths of the venturi elements 130. In such an arrangement, the dirty air flow axis 21 defined by the dirty air inlet 111 extends through or passes by the venturi elements 130 at a location between the dirty air side of the tubesheet 22 and the clean air inlets 132 and/or that does not extend through any of the filter elements 40 in the dirty air chamber 26.

Figure 4E:
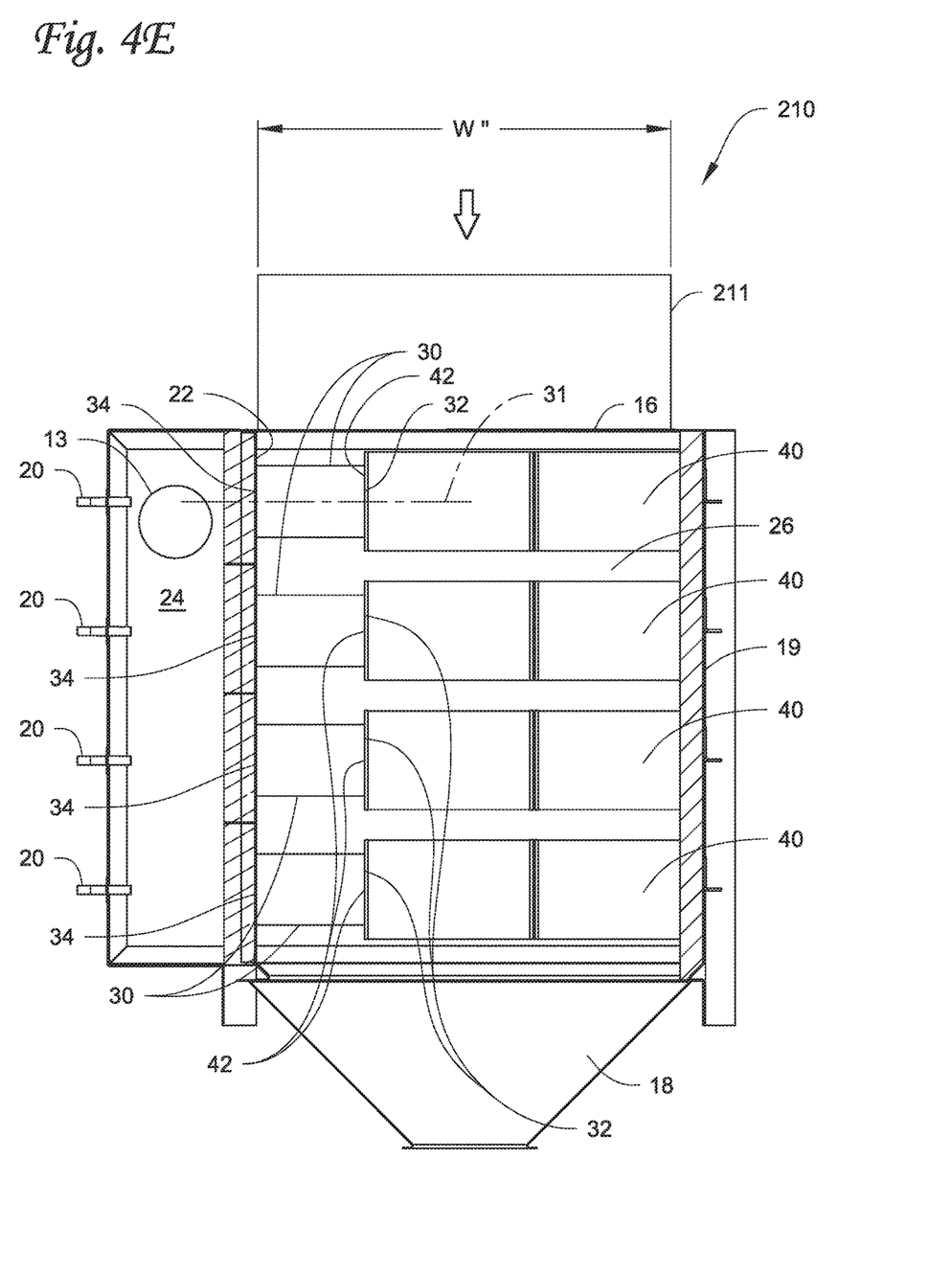
FIG. 4E is a cross-sectional view of another alternative illustrative embodiment of a filter system including spacer elements as described herein.

Still another alternative embodiment of a filter system as described herein is depicted in connection with FIG. 4E. The primary difference between the illustrative embodiment of the filter system 210 depicted in FIG. 4E and those described elsewhere herein is in the size of the dirty air inlet 211 (the other features and components of the filter system 210 remaining largely the same as in the other illustrative embodiments of filter systems described herein).

In the illustrative embodiment depicted in FIG. 4E, the width (W") of the dirty air inlet 211 is measured in a direction parallel to the element axes 31 extending though the clean air inlets 32 and clean air outlets 34 of the spacer elements 30 (which could, in one or more embodiments, be venturi elements as described herein). The width W" of the dirty air inlet 211 may be described as being as large as the width of the dirty air chamber 26 from the tubesheet 22 to the end wall panel 19. Although not depicted in FIG. 4E, the depth of the dirty air inlet 211 may be equal to or less than the depth of the dirty air chamber 26 as measured between the opposing side wall panels 17—i.e., the dirty air inlet 211 may, in one or more embodiments, occupy the entire portion of the upper wall panel 16 located above the dirty air chamber 26 (see, e.g., FIGS. 1-3).

Another manner in which the arrangement of spacer elements 30, filter elements 40, and the dirty air inlet 211 may be characterized is that, in one or more embodiments of the filter systems described herein, the dirty air inlet 211 may have a width W" that is equal to or less than the width of the dirty air chamber 26 as measured from the dirty air side of the tubesheet 22 to the end wall panel 19 and, further, that the spacer elements 30 and their attached filter elements 40 also extend from the dirty air side of the tubesheet 22 to the end wall panel 19.

The larger dirty air inlet 211 depicted in connection with filter system 210 may, in one or more embodiments, contribute to reduced velocity within the dirty air chamber 26 which may, as described herein provide advantages in one or more filter systems as described herein.

Figure 5:
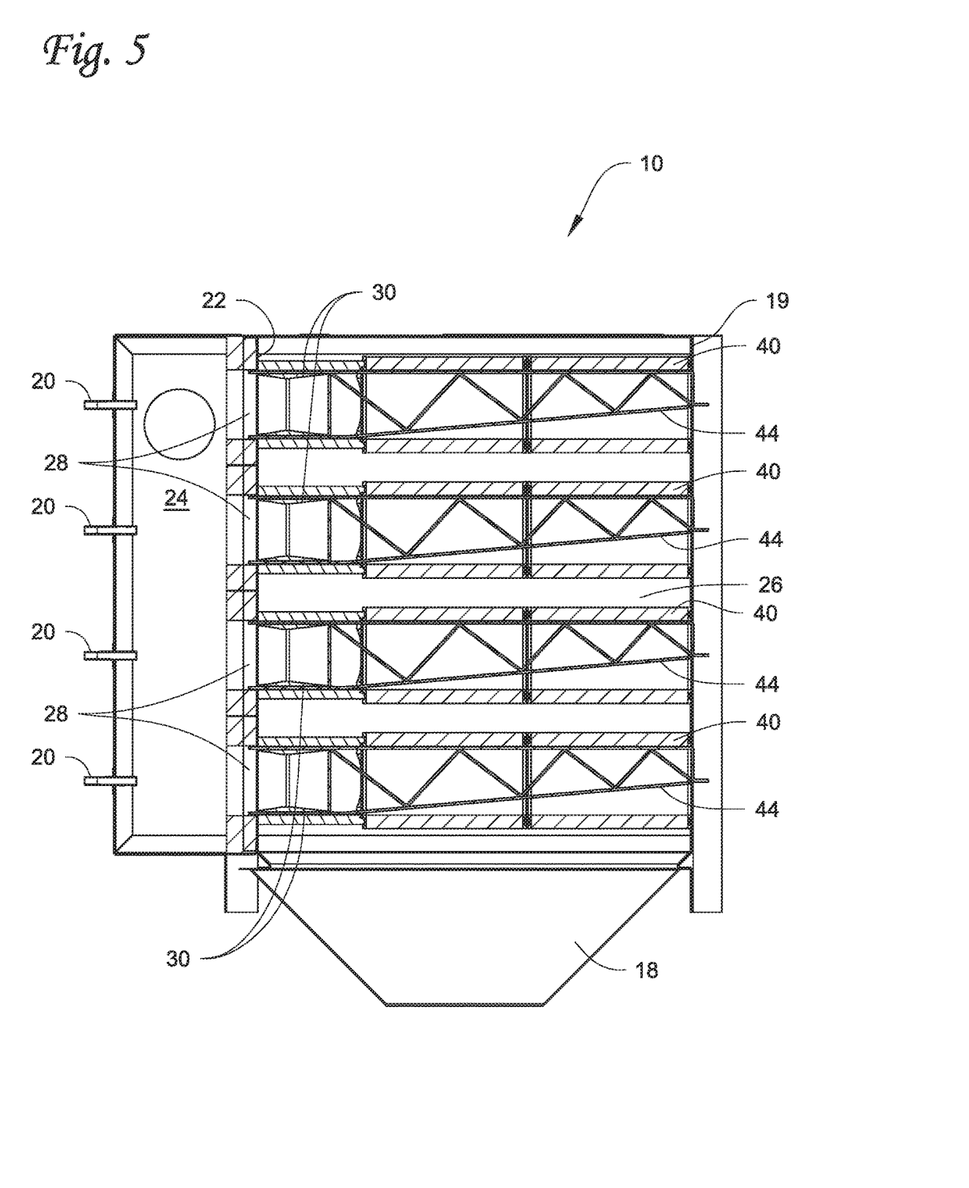
FIG. 5 is a cross-sectional view of the filter system of FIGS. 1-3 taken along line 5-5 in FIG. 3.
Figure 6:
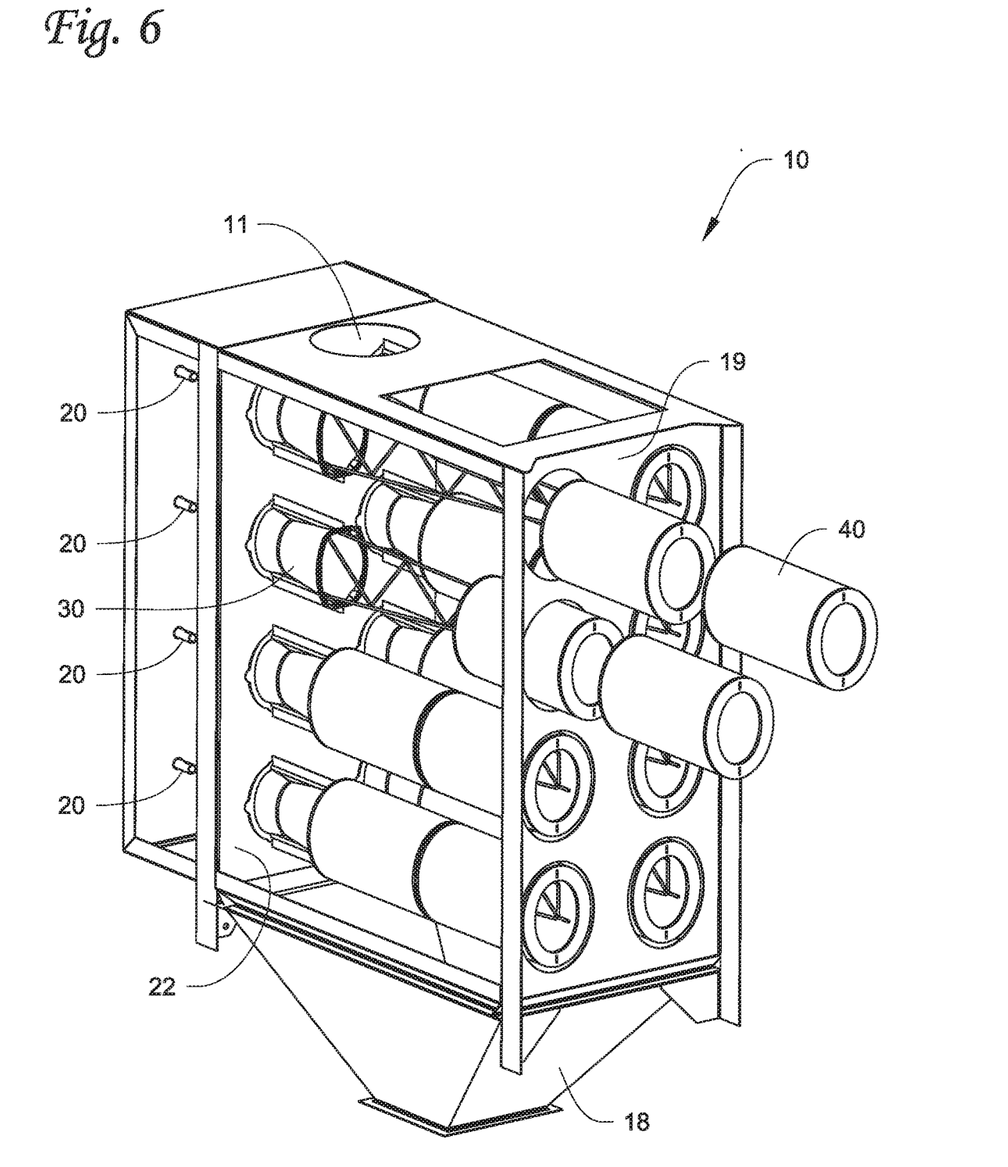
FIG. 6 is partially exploded perspective view of the filter system of FIGS. 1-5.

Referring to FIGS. 5 and 6, which are, respectively, a cross-sectional view of the filter system of FIG. 1 taken along line 5-5 in FIG. 3 and a partially exploded perspective view of the filter system 10 with some of the walls removed to reveal the spacer elements 30 (in the form of venturi elements as discussed herein) and filter elements 40 located in the dirty air chamber of the filter system 10. It should be understood that the specific features and components depicted connection with the filter system 10 seen in FIGS. 5 and 6 are illustrative in nature only and, unless explicitly recited in the claims, they should not be construed to limit the scope of the present invention.

The apertures 28 in the tubesheet 22 over which the spacer elements 30 are positioned are seen in the cross-sectional view of FIG. 5. Although each spacer element 30 is depicted as being positioned over only one aperture 28, in one or more alternative embodiments, the clean air outlet 34 of each spacer element 30 may be positioned over more than one aperture in the tubesheet 22 (although it may be desirable to match the size and/or shape of the aperture 28 to the size and/or shape of the clean air outlet 34).

Also seen in FIG. 5 are optional yokes 44 that may, in one or more embodiments, be attached to the spacer elements 30 and/or the tubesheet 22. The yokes 44 may be provided to assist in supporting the filter elements 40 within the housing of the filter system 10. The use of yokes and/or other structures for supporting filter elements in a filter system may be described in, e.g., U.S. Pat. No. 3,942,962 (Duyckinck), U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), and U.S. Pat. No. 7,641,708 (Kosmider et al.).

Although the filter elements 40 depicted in FIGS. 4-6 are in the form of two-part cartridges, the filter systems described herein can be adapted to use a variety of filter elements provided the filter elements can be used in conjunction with spacer elements as described herein. In one or more embodiments, for example, the filter elements may take the form of, e.g., bags, socks, cartridges, etc.

The blowpipes 20 depicted in connection with the illustrative embodiment of filter system 10 are configured to direct air into the spacer elements 30 through the apertures 28 in the tubesheet 22. The air from each of the blowpipes 20 enters the clean air outlet 34 of a corresponding spacer element 30 and exits into the filter element 40 through the clean air inlet 32 to remove particulate matter from the filter elements 40 in a manner similar to that described in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

The blowpipes 20 may be provided as part of a pulse-jet cleaning system including one or more sources of pressurized gas (e.g., air), valves and a control system. Illustrative embodiments of potentially suitable pulse-jet cleaning systems may be found in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No.

8,075,648 (Raether). In one or more embodiments of the filter systems described herein, the blowpipes used may include the diverging nozzles and other components and methods described in US Provisional Patent Application No. 61/772,198 titled DIVERGING NOZZLES AND FILTER ELEMENT CLEANING SYSTEMS USING DIVERGING NOZZLES, filed on Mar. 4, 2013.

U.S. Provisional Patent Application No. 61/789,385, titled OVATE TUBULAR FILTER CARTRIDGES AND FILTER SYSTEMS USING THE SAME, filed on Mar. 15, 2013, describes filter cartridges that may, in one or more embodiments, be used in the filter systems described herein.

In addition, U.S. Provisional Patent Application No. 61/648,494, titled FILTER ASSEMBLY WITH DIRTY AIR CHAMBER VENTURI ELEMENTS, filed on May 17, 2012 may describe features and arrangements of filter systems and systems that may be used in connection with the filter systems described herein.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of filter systems and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A filter system comprising:
 a housing comprising a tubesheet separating the housing into a dirty air chamber and a clean air chamber, wherein the housing comprises an end wall panel located across the dirty air chamber from the tubesheet;
 a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber;
 a plurality of apertures in the tubesheet, wherein each spacer element of the plurality of spacer elements is positioned over an aperture of the plurality of apertures in the tubesheet such that air passing from the dirty air chamber into the clean air chamber through each spacer element of the plurality of spacer elements passes through the aperture,
 a plurality of filter elements, wherein each filter element of the plurality of filter elements is attached to the clean air inlet of one spacer element of the plurality of spacer elements; and
 a dirty air inlet configured to deliver a dirty air stream into the dirty air chamber;
 wherein each spacer element of the plurality of spacer elements comprises an element length measured along an element axis extending though the clean air inlet and the clean air outlet of the spacer element, and wherein the dirty air inlet defines a width measured parallel to the element axis that is greater than the element length of each spacer element of the plurality of spacer elements;
 wherein each spacer element of the plurality of spacer elements and the filter element attached to each spacer element extend across the dirty air chamber from the tubesheet to the end wall panel;
 and wherein the dirty air inlet is configured to deliver the dirty air stream into the dirty air chamber along a dirty air flow axis, and wherein the dirty air flow axis extends through or passes at least one spacer element of the plurality of spacer elements at a location between the clean air inlet and the clean air outlet of the at least one spacer element.

2. A system according to claim 1, wherein the dirty air flow axis does not extend through any filter elements of the plurality of filter elements.

3. A filter system according to claim 2, wherein the dirty air flow axis extends through or passes at least one spacer element of the plurality of spacer elements at a location between the clean air inlet and the clean air outlet of the at least one spacer element.

4. A filter system according to claim 1, wherein each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

5. A filter system according to claim 1, wherein the tubesheet comprises a dirty air side facing the dirty air chamber and a clean air side facing the clean air chamber, and wherein the clean air outlet of each spacer element of the plurality of spacer elements is positioned on the dirty air side of the tubesheet.

6. A filter system according to claim 1, wherein each spacer element of the plurality of spacer elements does not extend into the clean air chamber.

7. A filter system according to claim 1, wherein the plurality of spacer elements comprises a plurality of venturi elements, wherein each venturi element of the plurality of venturi elements comprises a throat located between a clean air inlet and a clean air outlet, and wherein the clean air inlet of each venturi element of the plurality of venturi elements is located in the dirty air chamber.

8. A filter system according to claim 7, wherein the throat of each venturi element of the plurality of venturi elements is positioned on the dirty air side of the tubesheet and is exposed within the dirty air chamber.

9. A filter system comprising:
 a tubesheet separating a housing into a dirty air chamber and a clean air chamber;
 a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber;
 a plurality of apertures in the tubesheet, wherein each spacer element of the plurality of spacer elements is positioned over an aperture of the plurality of apertures in the tubesheet;
 a plurality of filter elements in the dirty air chamber between the tubesheet and an end wall panel located across the dirty air chamber from the tubesheet, wherein each filter element of the plurality of filter elements is attached to the clean air inlet of one spacer element of the plurality of spacer elements;

a dirty air inlet configured to deliver a dirty air stream into the dirty air chamber; and a pulse-jet cleaning system comprising a blowpipe oriented to direct a pulse of air into the clean air outlet and toward the clean air inlet of each spacer element of the plurality of spacer elements;

wherein each spacer element of the plurality of spacer elements comprises an element length measured along an element axis extending though the clean air inlet and the clean air outlet of the spacer element, and wherein the dirty air inlet defines a width measured parallel to the element axis that is greater than the element length of each spacer element of the plurality of spacer elements;

wherein the dirty air inlet comprises a perimeter where the dirty air inlet enters the dirty air chamber, and further wherein a projection of the perimeter parallel to the dirty air flow axis through the dirty air chamber intersects one or more filter elements of the plurality of filter elements;

and wherein the dirty air inlet is configured to deliver the dirty air stream into the dirty air chamber along a dirty air flow axis, and wherein the dirty air flow axis extends through or passes at least one spacer element of the plurality of spacer elements at a location between the clean air inlet and the clean air outlet of the at least one spacer element.

10. A filter system according to claim 9, wherein the housing comprises an end wall panel located across the dirty air chamber from the tubesheet, and wherein each spacer element of the plurality of spacer elements and the filter element attached to each spacer element extend across the dirty air chamber from the tubesheet to the end wall panel.

11. A filter system according to claim 9, wherein the dirty air flow axis does not extend through any filter elements of the plurality of filter elements.

12. A filter system according to claim 11, wherein the dirty air flow axis extends through or passes at least one spacer element of the plurality of spacer elements at a location between the clean air inlet and the clean air outlet of the at least one spacer element.

13. A filter system according to claim 9, wherein each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

14. A filter system according to claim 9, wherein the tubesheet comprises a dirty air side facing the dirty air chamber and a clean air side facing the clean air chamber, and wherein the clean air outlet of each spacer element of the plurality of spacer elements is positioned on the dirty air side of the tubesheet.

15. A filter system according to claim 9, wherein the plurality of spacer elements comprises a plurality of venturi elements, wherein each venturi element of the plurality of venturi elements comprises a throat located between a clean air inlet and a clean air outlet, and wherein the clean air inlet of each venturi element of the plurality of venturi elements is located in the dirty air chamber.

16. A filter system according to claim 9, wherein the system further comprises a pulse-jet cleaning system comprising a blowpipe oriented to direct a pulse of air into the clean air outlet and toward the clean air inlet of each spacer element of the plurality of spacer elements.

17. A filter system comprising a housing comprising a tubesheet separating the housing into a dirty air chamber, a clean air chamber, an end wall panel located across the dirty air chamber from the tubesheet, and a hopper located below the dirty air chamber, wherein at least a portion of particulate matter entering the dirty air chamber falls into the hopper under the force of gravity;

a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber;

a plurality of apertures in the tubesheet, wherein each spacer element of the plurality of spacer elements is positioned over an aperture of the plurality of apertures in the tubesheet such that air passing from the dirty air chamber into the clean air chamber through each spacer element of the plurality of spacer elements passes through the aperture, a plurality of filter elements, wherein each filter element of the plurality of filter elements is attached to the clean air inlet of one spacer element of the plurality of spacer elements, wherein each spacer element of the plurality of spacer elements and the filter element attached to each spacer element are positioned above the hopper, and wherein each spacer element of the plurality of spacer elements and the filter element attached to each spacer element extend from the tubesheet towards the end wall panel; and a dirty air inlet configured to deliver a dirty air stream into the dirty air chamber along a dirty air flow axis, wherein the dirty air flow axis extends through the hopper;

and wherein the dirty air flow axis extends through or passes at least one spacer element of the plurality of spacer elements at a location between the clean air inlet and the clean air outlet of the at least one spacer element.

18. A filter system according to claim 17, wherein each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

19. A filter system according to claim 17, wherein the dirty air inlet comprises a perimeter where the dirty air inlet enters the dirty air chamber, and further wherein a projection of the perimeter parallel to the dirty air flow axis through the dirty air chamber intersects one or more filter elements of the plurality of filter elements.

20. A filter system comprising a housing comprising a tubesheet separating the housing into a dirty air chamber, a clean air chamber, and a hopper located below the dirty air chamber, wherein at least a portion of particulate matter entering the dirty air chamber falls into the hopper under the force of gravity;

a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber, and wherein each spacer element of the plurality of spacer elements defines an element axis extending though the clean air inlet and the clean air outlet of the spacer element, wherein the element axes of the plurality of spacer elements do not extend through the hopper;

a plurality of apertures in the tubesheet, wherein each spacer element of the plurality of spacer elements is positioned over an aperture of the plurality of apertures in the tubesheet such that air passing from the dirty air chamber into the clean air chamber through each spacer element of the plurality of spacer elements passes through the aperture, a plurality of filter elements, wherein each filter element of the plurality of filter elements is attached to the clean air inlet of one spacer element of the plurality of spacer elements, wherein each spacer element of the plurality of spacer elements and the filter element attached to each spacer element are positioned above the hopper, and wherein each spacer element of the plurality of spacer elements and the filter element attached to each spacer element; and a dirty air inlet configured to deliver a dirty air stream into the dirty air chamber along a dirty air flow axis, wherein the dirty air flow axis extends through or passes at least one spacer element of the plurality of spacer elements at a location between the clean air inlet and the clean air outlet of the at least one spacer element.

21. A filter system according to claim 20, wherein the dirty air flow axis extends through the hopper.

22. A filter system according to claim 20, wherein each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

23. A filter system according to claim 20, wherein the dirty air inlet comprises a perimeter where the dirty air inlet enters the dirty air chamber, and further wherein a projection of the perimeter parallel to the dirty air flow axis through the dirty air chamber intersects one or more filter elements of the plurality of filter elements.

24. A filter system comprising:
a tubesheet separating a housing into a dirty air chamber and a clean air chamber;
a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber;
a plurality of apertures in the tubesheet, wherein each spacer element of the plurality of spacer elements is positioned over an aperture of the plurality of apertures in the tubesheet;
a plurality of filter elements in the dirty air chamber between the tubesheet and an end wall panel located across the dirty air chamber from the tubesheet, wherein each filter element of the plurality of filter elements is attached to the clean air inlet of one spacer element of the plurality of spacer elements;
a dirty air inlet configured to deliver a dirty air stream into the dirty air chamber; and a pulse-jet cleaning system comprising a blowpipe oriented to direct a pulse of air into the clean air outlet and toward the clean air inlet of each spacer element of the plurality of spacer elements;

wherein each spacer element of the plurality of spacer elements comprises an element length measured along an element axis extending though the clean air inlet and the clean air outlet of the spacer element, and wherein the dirty air inlet defines a width measured parallel to the element axis that is greater than the element length of each spacer element of the plurality of spacer elements;

wherein the dirty air inlet comprises a perimeter where the dirty air inlet enters the dirty air chamber, and further wherein a projection of the perimeter parallel to the dirty air flow axis through the dirty air chamber intersects one or more filter elements of the plurality of filter elements;

and wherein the dirty air inlet is configured to deliver the dirty air stream into the dirty air chamber along a dirty air flow axis, and wherein the dirty air flow axis does not extend through any filter elements of the plurality of filter elements.

25. A filter system according to claim 24, wherein the housing comprises an end wall panel located across the dirty air chamber from the tubesheet, and wherein each spacer element of the plurality of spacer elements and the filter element attached to each spacer element extend across the dirty air chamber from the tubesheet to the end wall panel.

26. A filter system according to claim 24, wherein the dirty air flow axis extends through or passes at least one spacer element of the plurality of spacer elements at a location between the clean air inlet and the clean air outlet of the at least one spacer element.

27. A filter system according to claim 24, wherein each spacer element of the plurality of spacer elements comprises an element length measured along an element axis extending though the clean air inlet and the clean air outlet of the spacer element, and wherein the dirty air inlet defines a width measured parallel to the element axis that is less than or equal to 2 times an average element length of the plurality of element lengths of the plurality of spacer elements.

28. A filter system according to claim 24, wherein the tubesheet comprises a dirty air side facing the dirty air chamber and a clean air side facing the clean air chamber, and wherein the clean air outlet of each spacer element of the plurality of spacer elements is positioned on the dirty air side of the tubesheet.

29. A filter system according to claim 24, wherein the plurality of spacer elements comprises a plurality of venturi elements, wherein each venturi element of the plurality of venturi elements comprises a throat located between a clean air inlet and a clean air outlet, and wherein the clean air inlet of each venturi element of the plurality of venturi elements is located in the dirty air chamber.

30. A filter system according to claim 24, wherein the system further comprises a pulse-jet cleaning system comprising a blowpipe oriented to direct a pulse of air into the clean air outlet and toward the clean air inlet of each spacer element of the plurality of spacer elements.

31. A filter system comprising:
a housing comprising a tubesheet separating the housing into a dirty air chamber and a clean air chamber, wherein the housing comprises an end wall panel located across the dirty air chamber from the tubesheet;
a plurality of spacer elements attached to the tubesheet, wherein each spacer element of the plurality of spacer elements comprises a clean air inlet and a clean air outlet, and wherein the clean air inlet of each spacer element of the plurality of spacer elements is located in the dirty air chamber;

a plurality of apertures in the tubesheet, wherein each spacer element of the plurality of spacer elements is positioned over an aperture of the plurality of apertures in the tubesheet such that air passing from the dirty air chamber into the clean air chamber through each spacer element of the plurality of spacer elements passes through the aperture, a plurality of filter elements, wherein each filter element of the plurality of filter elements is attached to the clean air inlet of one spacer element of the plurality of spacer elements; and a dirty air inlet configured to deliver a dirty air stream into the dirty air chamber;

wherein each spacer element of the plurality of spacer elements comprises an element length measured along an element axis extending though the clean air inlet and the clean air outlet of the spacer element, and wherein the dirty air inlet defines a width measured parallel to the element axis that is greater than the element length of each spacer element of the plurality of spacer elements;

wherein each spacer element of the plurality of spacer elements and the filter element attached to each spacer element extend across the dirty air chamber from the tubesheet to the end wall panel;

and wherein the dirty air inlet is configured to deliver the dirty air stream into the dirty air chamber along a dirty air flow axis, and wherein the dirty air flow axis does not extend through any filter elements of the plurality of filter elements.

32. A filter system according to claim 31, wherein the dirty air flow axis extends through or passes at least one spacer element of the plurality of spacer elements at a location between the clean air inlet and the clean air outlet of the at least one spacer element.

33. A filter system according to claim 31, wherein the dirty air inlet defines a width measured parallel to the element axis that is less than or equal to 2 times an average element length of the plurality of element lengths of the plurality of spacer elements.

34. A filter system according to claim 31, wherein the tubesheet comprises a dirty air side facing the dirty air chamber and a clean air side facing the clean air chamber, and wherein the clean air outlet of each spacer element of the plurality of spacer elements is positioned on the dirty air side of the tubesheet.

35. A filter system according to claim 31, wherein each spacer element of the plurality of spacer elements does not extend into the clean air chamber.

36. A filter system according to claim 31, wherein the plurality of spacer elements comprises a plurality of venturi elements, wherein each venturi element of the plurality of venturi elements comprises a throat located between a clean air inlet and a clean air outlet, and wherein the clean air inlet of each venturi element of the plurality of venturi elements is located in the dirty air chamber.

37. A filter system according to claim 36, wherein the throat of each venturi element of the plurality of venturi elements is positioned on the dirty air side of the tubesheet and is exposed within the dirty air chamber.

* * * * *